Sept. 14, 1965  G. G. F. SMEETS  3,205,748
ADJUSTABLE SHEARING TOOL
Filed May 31, 1963
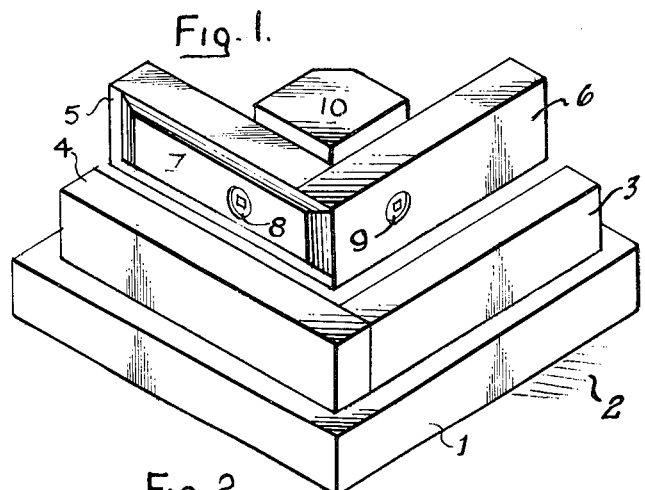
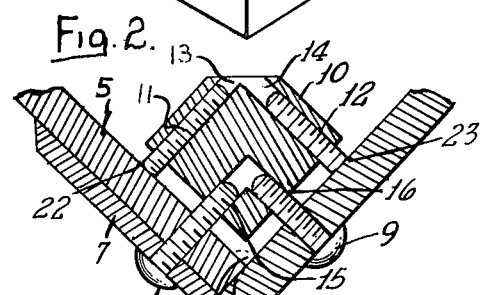
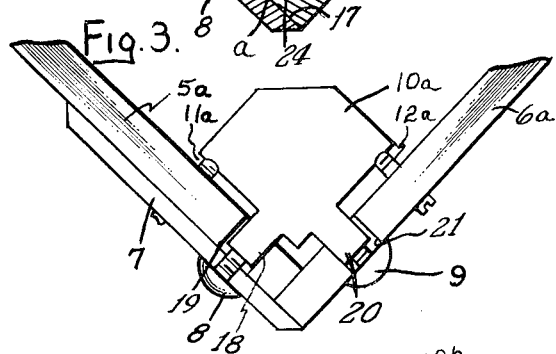
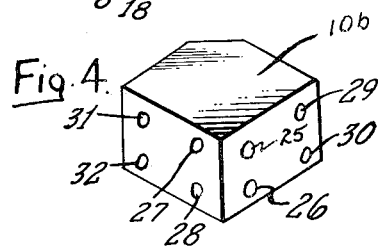

United States Patent Office 3,205,748
Patented Sept. 14, 1965

3,205,748
ADJUSTABLE SHEARING TOOL
Gerard Gaston Frans Smeets, Brampton, Ontario, Canada, assignor to Pierce-All Manufacturing Limited, Rexdale, Ontario, Canada
Filed May 31, 1963, Ser. No. 284,680
8 Claims. (Cl. 83—619)

This invention relates to metal working machines and more particularly to metal notching wherein the shearing action takes place along two lines which intersect at an angle to each other, for instance, corner notching wherein the shear lines intersect at 90°.

The shearing tools for such an operation comprise a die consisting of a member having a shear edge with an angular configuration such that the shear cut takes the form of the corner of a square. The die shear tool is normally made up of two shear elements so aranged as to form an angle therebetween, for instance 90°, and are supported or secured in this relationship by a base member usually machined for this purpose. The base member is generally secured to the work table of a machine press. A further pair of shear elements are provided to complete the shearing tool and these latter shear elements must be movably supported and aligned with respect to the die shear elements so that the proper shearing action will ensue on operation of the press.

It is very difficult to adjust the second pair of shear elements to the same angle as the die shear elements and allow for the movement necessary for the notching action. The inaccurate alignment between the elements results in that much greater shearing pressure is required to operate the press and as a consequence the shearing elements must be accordingly strengthened. In addition, the elements must be securely fastened with respect to each other and the practice has been to use bolts passing through one element and threaded into the other at the apex of the angle. Heavy elements are required to embody these bolts with the result that the complete tool becomes cumbersome and expensive.

Since accurate alignment is generally not achieved, wear of the tools is excessive.

The movable shear elements may be machined in one piece but this is difficult and uneconomical and is generally not done.

It is an object of this invention to provide a means of adjusting at least one pair of the shearing elements so that the angle between these elements can be easily and accurately aligned with that of the other pair.

It is a further object of this invention to provide an alignment means which is economical and renders the use of high-bulk shearing elements unnecessary.

According to the invention, two shearing elements, enclosing an angle therebetween, are made readily adjustable with respect to each other by the use of an adjustable angle block secured by bolts in spaced relationship to and between the elements, there being provided adjustable fulcrum points between each element and an adjacent face of the angle block against which the securing bolts act to fix the angle between the elements.

The invention will now be described with reference to the figures of the drawings in which;

FIGURE 1 shows a substantially complete notch shearing tool,

FIGURE 2 shows an enlarged cross-sectioned view of the angle adjusting block located between two shearing elements, FIGURE 3 shows a modification of the angle block of FIGURE 2, and FIGURE 4 shows a double angle block.

Referring now to FIGURE 1, a die support member 1 is shown resting on a surface 2 which may be the table of a machine press. Support member 1 may be a casting which has been machined to receive, in machined slots, die shear elements 3, 4 forming an angle therebetween at their point of contact. The angle may be, for instance, 90°. Elements 3, 4 may be secured in member 1 by screws or other suitable means or they may be held in position solely by the machined slots.

A further pair of shear elements 5, 6, providing an adjustable angle therebetween, are secured, for instance, to the ram of a press, not shown. An elongated block or stop member 7, which may be integral with element 5, provides for accurate alignment of the end surface of element 6 with the side surface of element 5. An adjustable angle block 10 is supported in spaced relationship to shear elements 5, 6 as is more clearly illustrated in cross-section plan view in FIGURE 2 to which reference will now be made.

Angle block 10 is secured to shear elements 5, 6 by means of bolts 8, 9 spaced from the common junction 24 of elements 5, 6 so that block 10 cannot be brought to bear against either of these elements while both bolts 8, 9 are screwed into threaded holes 15, 16 respectively of block 10. Two set screws 11, 12, threaded into holes 13, 14 provided therefor in block 10, bear against elements 5, 6 at points 22, 23 respectively. Bolts 8, 9 provided with a limited clearance in elements 5, 6 respectively so that minor adjustment of the angle between elements 5 and 6 may be carried out as follows.

Either or both set screws 11, 12 is turned back a short distance into block 10 while bolts 8 and 9 are tighteend. As a consequence the angle $a$, between elements 5 and 6 is decreased since the bolts 8, 9 cannot draw the contacting ends of elements 5, 6 closer together because of the existence of bearing surface 24, contact with the end of element 5 being moved closer to the inside edge thereof.

Conversely, if now bolts 8, and 9 are loosened and set screws 11, 12 turned out against elements 5, 6 respectively and bolts 8 and 9 retightened, then the angle "$a$" is increased.

The degree of adjustment possible is small but nevertheless is sufficient for the final alignment purposes whereby an extermely accurately aligned shearing tool may be achieved.

Referring now to FIGURE 3, a modification of the invention is shown wherein shearing elements 5, 6 are provided with transverse slots 19, 21 and corner block 10a provided with projecting tabs 18, 20 which cooperate with the slots to relieve bolts 8, 9 of the transverse shear force they are subjected to in the embodiment shown in FIGURE 2. Sufficient clearance is allowed in the bolt holes in elements 5, 6 to ensure this.

In the embodiment of FIGURE 3, set screws 11a, 12a are threaded into members 5a, 6a and their inner ends bear against the adjacent side surfaces of block 10a. With this arrangement adjustment of the alignment can be made from one side of the tool.

FIGURE 4 shows an angle block in which provision is made for two sets of adjusting screws and bolts for each shear element. This double corner block allows for more precise adjustment of the shear elements with respect to each other.

Although the angle blocks shown are described as providing substantially a right angle for angle "$a$," it will be obvious that angles greater or lesser than 90° may readily be achieved. The locations of the set screws and bolts may be interchanged and angle adjustment readily made.

Various other modifications may occur to those skilled in the art which do not depart from the spirit and scope of this invention.

What is claimed is:

1. A shearing tool for use with a machine press comprising a base member supporting two die shear elements in end-to-end relationship to form an angle therebetween, a cooperating tool member including two shearing tool elements adjustably secured in similar end-to-end relationship, to form a similar angle therebetween and to cooperate with the first said elements to produce a notch shear cut, an angle block secured in spaced relationship between said shearing tool elements by two bolts, one passing through each of said shearing tool elements, said bolts being spaced from the apex of the angle to prevent said angle block being drawn into contact with either of said shearing tool elements, a fulcrum member between each shearing tool element and the adjacent side of said angle block and spaced longitudinally of said shearing tool element with respect to the bolt passing therethrough and wherein at least one of the fulcrum members is made adjustable in height with respect to the face of the block.

2. The shearing tool as claimed in claim 1 wherein said fulcrum means comprises a set screw threaded into said angle block.

3. The shearing tool as claimed in claim 1 wherein said fulcrum means comprises a set screw threaded into said shearing tool element.

4. A shearing tool for use with a machine press comprising a base member supporting two die shear elements in end-to-end relationship to form an angle therebetween, a cooperating tool member including two shearing tool elements adjustably secured in similar end-to-end relationship, to form a similar angle therebetween and to cooperate with the first said two elements to produce a notch shear cut, an angle block secured in spaced relationship between said shearing tool elements by at least two bolts, one passing through each of said shearing tool elements, and wherein each is threaded into a projecting tab provided on said angle block, one of each of said tabs extending into a cooperating opening in each shearing tool element to prevent said angle block being drawn against either shearing tool element when in assembled relationship, and an adjustable fulcrum member between each shearing tool member and the adjacent side of said angle block and spaced longitudinally of said shearing tool member with respect to each bolt passing therethrough.

5. The shearing tool as claimed in claim 4, wherein said fulcrum means comprises a set screw threaded into said angle block.

6. The shearing tool as claimed in claim 4 wherein said fulcrum means comprises a set screw threaded into said shearing tool element.

7. An adjustable shearing tool member comprising first and second shearing elements adjustably secured in end-to-end relationship and forming an angle therebetween for a shear cut, an angle block secured in spaced relationship between said shearing tool elements by two bolts, one passing through each of said shearing tool elements, said bolts being spaced from the apex of the angle to prevent said angle block being drawn into contact with either said shearing tool elements, and an adjustable fulcrum element between each shearing tool element and the adjacent side of said angle block and spaced longitudinally of said shearing tool element with respect to the bolt passing therethrough.

8. An adjustable shearing tool member comprising first and second shearing elements adjustably secured in end-to-end relationship and forming an angle therebetween for a shear cut, an angle block secured in spaced relationship between said shearing tool elements by at least two bolts, one passing through each of said shearing tool elements, wherein said angle block is provided with two projecting tabs each of which extends into a cooperating opening in one of the shearing tool elements to prevent said angle block being drawn against either shearing tool member when in assembled relationship, and an adjustable fulcrum member between each shearing tool element and the adjacent side of said angle block and spaced longitudinally of said shearing tool element with respect to each bolt passing therethrough.

References Cited by the Examiner

UNITED STATES PATENTS

| | | | |
|---|---|---|---|
| 1,365,070 | 1/21 | Zealand | 83—700 X |
| 1,866,855 | 7/32 | Kirsten | 83—700 X |
| 2,582,522 | 1/52 | Battersby | 83—700 X |
| 2,593,144 | 4/52 | Hercik | 83—700 X |
| 3,121,939 | 2/64 | Williams | 29—105 X |

WILLIAM W. DYER, JR., *Primary Examiner.*

LEON PEAR, ANDREW R. JUHASZ, *Examiners.*